Patented May 22, 1945

2,376,350

UNITED STATES PATENT OFFICE 2,376,350

REGULATION OF THE POLYMERIZATION OF BUTADIENE-1,3 HYDROCARBONS

Charles F. Fryling, Silver Lake, Ohio, assignor to The B. F. Goodrich Company, New York, N. Y., a corporation of New York No Drawing. Application November 29, 1940, Serial No. 367,763

7 Claims. (Cl. 260—84.5)

This invention relates to the polymerization of butadiene-1,3 hydrocarbons, and to a method whereby the polymerization can be regulated to produce polymers possessing the desired properties.

It is known that the temperature at which polymerizations are conducted is one of the factors which determine the properties of the polymer. By conducting polymerizations at low temperatures, as from 20°–40° C., polymers are formed which exhibit rubbery properties to a much greater degree than polymers formed at high temperatures, as from 70°–100° C. This is believed to be due, at least in part, to the fact that a low temperature promotes the formation of long polymeric chains with few cross-linkages. In the ordinary emulsion polymerization of a butadiene-1,3 hydrocarbon, there is at the beginning of the reaction a period of time, called the induction period, during which no visible change occurs. During this period, the temperature may be varied at will without affecting the properties of the polymer. When visible polymerization starts, however, the temperature should be kept low if polymers similar to crude rubber are desired.

Polymerizations are exothermic reactions. It is relatively simple to maintain the temperature at the desired level during the polymerization of a small batch of an emulsion of polymerizable material, but it is very difficult to maintain the temperature at the desired low level when polymerizing several hundred or thousand gallons of emulsion by a batch process. It is either necessary to use an unduly large volume of water to allow sufficiently rapid dissipation of heat or to employ special cooling equipment. It is also difficult to maintain the desired low temperature in homogeneous polymerization unless large volumes of solvent are employed. Even when all apparently necessary precautions have been taken, it often happens that the exothermic reaction proceeds so rapidly at the end of the induction period that it is impossible to hold the temperature down to even the approximate desired level, and the charge is either ruined or polymerizes to form inferior products.

It is the object of this invention to provide a class of materials which may be added to polymerization batches to slow down the speed of the reaction and facilitate the maintenance of the temperature at the desired level. It is a further object of this invention to provide materials which have a beneficial rather than, as is ordinarily the case when retarders are present in polymerization batches, a detrimental effect on the properties of the resulting polymer.

In accordance with the method of this invention, a small amount of a tetra alkyl thiuram mono- or disulfide is incorporated in batches undergoing polymerization reactions. This class of compounds is well known and includes, for example, tetramethyl thiuram monosulfide, tetraethyl thiuram monosulfide, tetraisopropyl thiuram monosulfide, dimethyl diethyl thiuram monosulfide and the corresponding disulfides.

The effect of the tetraalkyl mono and disulfides on a polymerization reaction is shown by the copolymerization in emulsion at 30° C. of 75 parts by weight of butadiene and 25 parts by weight of acrylonitrile. In the absence of any of the retarders of this invention, a non-coherent, non-plastic polymer practically insoluble in benzene was formed in 36½ hours. In the presence of 0.4 parts by weight of tetramethyl thiuram disulfide, a non-coherent, somewhat plastic polymer 18% soluble in benzene was formed in about 275 hours. In the presence of 0.4 part by weight of tetramethyl thiuram monosulfide, a coherent, extremely plastic polymer 99% soluble in benzene was formed in about 275 hours.

The above experiments show the effect of the retarders of this invention upon the rate of the reaction and the properties of the product. When employing the method of this invention in commercial operations, particularly when only small amounts of materials tending to speed up the reaction are present, it may be desirable not to have the inhibiting material present during the induction period. The reaction may be allowed to proceed in a normal manner until the induction period is over and polymerization starts. At any time during the polymerization when the temperature rises, a small amount of one of the retarders of this invention may be added. The speed of the reaction will immediately decrease, and it will be possible to maintain the temperature at the desired level. In one case, a ton of a mixture of butadiene and acrylonitrile was being copolymerized in aqueous emulsion. At the end of the induction period, the polymerization proceeded at such a great rate that it was impossible to control the temperature. The addition of a half a pound of tetramethyl thiuram monosulfide, however, slowed up the reaction sufficiently to permit regulation of the temperature within the desired limits during the rest of the reaction, and at the same time produced a product having superior rubber-like properties.

The amount of thiuram mono- or disulfide added will depend upon a number of factors including the efficiency of the cooling equipment on the polymerizer, the rate at which the reaction is proceeding, and the amount of time which can be allowed for the reaction without making the production of the polymer economically unfeasible. Extremely small amounts of material, such as the .025% added in the specific example, profoundly affect the rate of the reaction. It is in general undesirable to catalyze the reaction to such an extent that over about 5% of inhibitor will be required, although when it is necessary to add greater amounts, a polymer having good properties will be produced after the polymerization has been carried on a sufficient length of time.

The inhibitor may conveniently be added in solution or suspension in one of the polymerizable materials, although merely dropping in a predetermined amount of the dry material produces the same result.

The method of this invention may be applied to any method of polymerization such as homogeneous polymerization in the presence of solvents and heterogeneous polymerization in aqueous emulsion. Regardless of the method of polymerization employed, the rate of polymerization may be controlled by the addition of a small amount of one of the retarders of this invention.

The retarders may be employed in the polymerization of butadiene-1,3 hydrocarbons by which is meant butadiene-1,3 (ordinary butadiene) and its hydrocarbon homologs which polymerize in essentially the same manner such as, 2,3-dimethylbutadiene, isoprene, and piperylene either alone or in admixture with each other or with comonomers that is, other unsaturated compounds copolymerizable therewith such as styrene, vinyl naphthalene, acrylonitrile, methyl methacrylate, methyl acrylate, vinyl acetate, vinylidene chloride, methyl vinyl ketone, methyl vinyl ether, and other polymerizable hydrocarbons, nitriles, esters, ketones and ethers. These comonomers are preferably, through not necessarily, employed in minor proportions.

The polymerization may be performed in the presence of any desired catalysts, catalyst activators, emulsifying agents, modifying agents, etc. In ordinary polymerizations, it has often been infeasible to employ the desired amounts of catalysts and catalyst activators because of the possibility of the reaction becoming uncontrollable at the end of the induction period. When using the method of this invention, however, optimum amounts of materials tending to speed up the reaction may be employed. As a result, the polymerizations performed in the presence of the retarders of this invention not only yield a superior product, but they need not require a longer time than polymerizations which are so weakly catalyzed that the reaction will be readily controllable at all times and which may therefore be safely performed in the absence of any retarder.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. In a process of converting a butadiene-1,3 hydrocarbon into a rubbery product by a polymerization reaction in aqueous emulsion, said reaction involving a preliminary stage, the induction period, during which no visible change in the emulsion occurs and a second stage, the polymerization stage, during which a visible change in the emulsion occurs and the rate of the reaction is substantially increased, the method of regulating the polymerization reaction which comprises adding to the emulsion comprising the butadiene-1,3 hydrocarbon undergoing the polymerization reaction at a time subsequent to the induction period and during the polymerization stage of the reaction a small amount of a member of the class consisting of tetraalkyl thiuram mono and disulfides and allowing the polymerization reaction to continue, whereby the rate of the reaction is retarded and the plasticity and solubility of the finished rubbery product is increased.

2. The method as claimed in claim 1 wherein a mixture of a butadiene-1,3 hydrocarbon and a compound copolymerizable therewith in aqueous emulsion, is converted into a rubbery product by a polymerization reaction in aqueous emulsion.

3. The method as claimed in claim 1 wherein a mixture of a butadiene-1,3 hydrocarbon and a compound copolymerizable therewith in aqueous emulsion, is converted into a rubbery product by a polymerization reaction in aqueous emulsion, and the alkyl groups in the compound added to the emulsion are methyl groups.

4. The method as claimed in claim 1 wherein a mixture of a butadiene-1,3 hydrocarbon and a compound copolymerizable therewith in aqueous emulsion, is converted into a rubbery product by a polymerization reaction in aqueous emulsion, and the alkyl groups in the compound added to the emulsion are ethyl groups.

5. The method as claimed in claim 1 wherein a mixture of butadiene-1,3 and a minor proportion of acrylonitrile is converted into a rubbery product by a polymerization reaction in aqueous emulsion and the compound added to the emulsion is tetramethyl thiuram monosulfide.

6. The method as claimed in claim 1 wherein a mixture of butadiene-1,3 and a minor proportion of acrylonitrile is converted into a rubbery product by a polymerization reaction in aqueous emulsion and the compound added to the emulsion is tetramethyl thiuram disulfide.

7. The method as claimed in claim 1 wherein a mixture of butadiene-1,3 and a minor proportion of acrylonitrile is converted into a rubbery product by a polymerization reaction in aqueous emulsion and the compound added to the emulsion is tetraethyl thiuram disulfide.

CHARLES F. FRYLING.